3,076,038
**PROCESS FOR THE PRODUCTION OF CYCLO-
DODECADIENE-MONONITROSOCHLORIDES**
Günther Wilke, Ernst Willi Müller, and Joachim Stede-
feder, Mulheim (Ruhr), Germany, assignors to Studien-
gesellschaft Kohle m.b.H., Mulheim (Ruhr), Germany,
a corporation of Germany
No Drawing. Filed June 7, 1960, Ser. No. 34,354
Claims priority, application Germany June 11, 1959
9 Claims. (Cl. 260—647)

This invention relates to a process for the production of cyclododecadiene-mononitrosochlorides.

It is known from German Patents Nos. 1,050,333, 1,043,329, and 1,056,123 that butadiene can be converted into cyclododecatri-(1,5,9)-ene of different configuration by means of organometallic mixed catalysts, the yields obtained being from 80 to 90% and higher. These compounds which are very easily produced from the process-wise point of view represent useful starting materials for the production of α,ω-bifunctional derivatives of n-dodecane, e.g. of the 13-membered lactam of ω-amino-dodecanoic acid or of α,ω-dodecanoic diacid provided that it is possible to react only one double bond selectively with other reactants and to remove the two further double bonds following this first reaction. However, the difficulty in these reactions resides in the fact that normally operation is only possible at low conversions otherwise it must be expected that not only one of the three identical double bonds will react but that rather a mixture of different reaction products will be obtained.

It is known that nitrosyl chloride can be added to olefins. The selective reaction of nitrosyl chloride with, for example, diolefins was also repeatedly described. It can be shown, however, that double bonds of very different constitution and consequently reactivity were reacted in these cases. (See U.S. Patents Nos. 2,485,180 and 2,485,185.)

It has now been found very surprisingly that the conversion of cyclododecatri-(1,5,9)-enes involves a selective reaction which leads to the formation of a cyclododecadiene-mononitroso chloride.

It is an object of this invention to provide a process for the production of cyclododecadiene-mononitrosochlorides by dissolving cyclododecatri-(1,5,9)-ene in a solvent which is inert to nitrosyl chloride and subsequent reaction with liquid or gaseous nitrosyl chloride.

Examples of solvents which are particularly well suited for the process of the invention include pentane, glacial acetic acid, nitromethane, liquid sulfur dioxide and others.

The reaction is preferably effected at temperatures from —80° to +50° C. or higher. The brown color of the nitrosyl chloride disappears by the reaction, the solutions accept a green to blue color and, with further addition, the nitrosochlorides precipitate in crystalline form. The pure mononitrosochloride of trans,trans,cis-cyclododecatri-(1,5,9)-ene, i.e. 1-nitroso-2-chloro-cyclododeca-trans-cis-di-(5,9)-ene, melts at 130° C. and that of all trans-cyclododecatri-(1,5,9)-ene, i.e. 1-nitroso-2-chloro-cyclododeca-trans-trans-di-(5,9)-ene, at 125° to 125.5° C. The directly precipitated reaction products are already largely pure.

It is particularly surprising in case of the process of the invention that even with a mole ratio of cyclododecatri-(1,5,9)-ene to nitrosyl chloride of 1:1 the reaction leads to the pure monoaddition product in yields of 70 to 80% and more without an attack of the two further double bonds of the molecule taking place.

In case of the trans,trans,cis-cyclododecatri-(1,5,9)-ene, the reaction is also largely selective with respect to the configuration of the double bonds, for it can be seen from the IR spectrum of the nitrosochloride that only the intensity of the band to be attributed to the central trans-double bonds is reduced while the corresponding absorption of the central cis-double bonds remained unchanged.

Thus, the peculiarity of the reaction of the cyclododecatri-(1,5,9)-enes with nitrosyl chloride especially resides in the unexpected selectively in the reaction of one mol with three identical, namely central double bonds, which selectivity leads to high yields of the novel and hitherto unknown cyclododecadiene-mononitrosochlorides. These compounds are a useful starting material for the production of the lactam of ω-aminododecanoic acid since, by hydrogenation of the two double bonds and removal of the chlorine atom, they can be converted into cyclododecanone oxime which gives the lactam by Beckmann rearrangement. Polymerization of the lactam gives a $C_{12}$ polyamide which has particularly useful characteristics from the technological point of view.

*Example 1*

162 grams (1 mol) of trans,trans,cis-cyclododecatri-(1,5,9)-ene are dissolved in 150 ml. of technical grade glacial acetic acid and the solution was mixed within 30 minutes at 10° C. with a solution of 65.5 gms. (1 mol) of nitrosyl chloride in 400 ml. of technical grade glacial acetic acid. After about three quarters of the nitrosyl chloride solution have been added, blue-green crystals begin to precipitate. After all of the nitrosyl chloride solution has been added, the mixture is stirred for another hour at 20° C. and is then subjected to suction filtration at 10° C. to recover the crystals which are washed twice in about 20 ml. of cool glacial acetic acid. The crystals are subjected to sharp suction filtration and are then dried in a water jet vacuum over caustic alkali. There are obtained 179 gms. (78% of the theory) of a faintly blue-green colored crystal powder which melts at 127–128° C. When recrystallized once from ethanol or hexane, the powder gives a white substance crystallizing in fine needles melting at 130° C. and undergoing no further change in melting point upon further recrystallization. The substance gives the Liebermann reaction and its analysis reveals the empirical formula $C_{12}H_{18}ONCl$. The IR spectrum is characterized by a series of bands between 1170 and 1260 cm.$^{-1}$.

*Example 2*

50 gms. of trans,trans,trans-cyclododecatri-(1,5,9)-ene are dissolved in 50 ml. of pentane. A solution of 20 gms. of nitrosyl chloride in 150 ml. of pentane is allowed to flow into the solution at 5–10° C. The red-brown color of the solution gradually turns to blue-green. The solution is stirred at room temperature until nitrosyl chloride is no longer condensed at an intense condenser (about 3 hours). The precipitated crystals are subjected to suction filtration and dried. The yield is 48 grams (69% of the theory) of a blue-green crystal powder having a melting point of 110–120° C. Upon recrystallization from hexane or ethanol, the melting point rises to 125–125.5° C. The IR spectrum of the substance includes the same series of bands as mentioned in Example 1.

*Example 3*

160 gms. of trans,trans,cis-cyclododecatri-(1,5,9)-ene are dissolved in 500 ml. of liquid sulfur dioxide at —40° C. Nitrosyl chloride in amount of 65 gms. is distilled into this solution and the mixture is stirred for 1 hour. The sulfur dioxide is then withdrawn at —40° C. The residue is mixed with 500 ml. of pentane and the mixture is subjected to suction filtration. There are obtained 215 gms. of a white-yellow substance having a melting point of 102–120° C. Upon recrystallization from hexane, the melting point rises to 127° C.

What we claim is:
1. A process for the production of a cyclododecadiene-mononitrosochloride, which comprises dissolving cyclododecatri-(1,5,9)-ene in a solvent inert to nitrosyl chloride, passing a fluid nitrosyl chloride through the solution thereby formed and recovering the resulting cyclododecadiene-mononitrosochloride.

2. Process according to claim 1, wherein said solvent is selected from the group consisting of pentane, glacial acetic acid, nitromethane and liquid sulfur dioxide.

3. Process according to claim 1, wherein said nitrosyl chloride is passed into and through said solution at a temperature between −80 and +50° C.

4. Process according to claim 1, wherein said cyclododecatri-(1,5,9)-ene is trans,trans,cis-cyclododecatri-(1,5,9)-ene.

5. Process according to claim 1, wherein said cyclododecatri-(1,5,9)-ene is trans,trans,trans-cyclododecatri-(1,5,9)-ene.

6. Process according to claim 1, wherein the molar ratio of cyclododecatri-(1,5,9)-ene to nitrosyl chloride is 1:1.

7. A cyclododecadiene-mononitrosochloride selected from the group consisting of 1-nitroso-2-chloro-cyclododeca-trans-cis-di-(5,9)-ene and 1-nitroso-2-chloro-cyclododeca-trans-trans-di-(5,9)-ene.

8. 1-nitroso-2-chloro-cyclododeca-trans-cis-di-(5,9)-ene having a melting point of 130° C.

9. 1-nitroso-2-chloro-cyclododeca-trans-trans-di-(5,9)-ene having a melting point of 125–125.5° C.

References Cited in the file of this patent
UNITED STATES PATENTS

| | | |
|---|---|---|
| 2,485,180 | Allison | Oct. 18, 1949 |
| 2,485,185 | Bordenca et al. | Oct. 18, 1949 |